(12) United States Patent
Kim

(10) Patent No.: US 12,504,382 B2
(45) Date of Patent: Dec. 23, 2025

(54) INSPECTION APPARATUS AND INSPECTION METHOD

(71) Applicant: SEMES CO., LTD., Cheonan-si (KR)

(72) Inventor: Hark Ryong Kim, Cheonan-si (KR)

(73) Assignee: SEMES CO., LTD., Chungcheongnam-do (KR)

( * ) Notice: Subject to any disclaimer, the term of this patent is extended or adjusted under 35 U.S.C. 154(b) by 210 days.

(21) Appl. No.: 18/323,698

(22) Filed: May 25, 2023

(65) Prior Publication Data

US 2024/0011915 A1   Jan. 11, 2024

(30) Foreign Application Priority Data

Jul. 6, 2022   (KR) .......................... 10-2022-0082856

(51) Int. Cl.
   *G01N 21/88*   (2006.01)
   *G01N 21/95*   (2006.01)

(52) U.S. Cl.
   CPC ..... *G01N 21/8806* (2013.01); *G01N 21/9501* (2013.01); *G01N 2021/8835* (2013.01);
   (Continued)

(58) Field of Classification Search
   CPC ........... G01N 21/8806; G01N 21/9501; G01N 2021/8835; G01N 2201/025;
   (Continued)

(56) References Cited

U.S. PATENT DOCUMENTS 11,143,600 B2 *  10/2021  Honda ................... H01L 22/12
2021/0028035 A1   1/2021  Lee et al.
(Continued)

FOREIGN PATENT DOCUMENTS

JP        2020-042035 A    3/2020
KR    10-2012-0027702 A    3/2012
(Continued)

OTHER PUBLICATIONS

Korean Office Action dated Jul. 28, 2024 issued in corresponding Korean Patent Appln. No. 10-2022-0082856.

*Primary Examiner* — Kevin K Pyo
(74) *Attorney, Agent, or Firm* — Harness, Dickey & Pierce, P.L.C.

(57) ABSTRACT

The present invention relates to an inspection apparatus and an inspection method which selectively adjust a numerical aperture of illuminating light in the form of collimated light when inspecting a target object, such as a wafer or the like, using a spectrum, thereby preventing a diffraction phenomenon caused by the illuminating light. The inspection apparatus may include: a camera unit disposed above a target object; an illumination unit configured to illuminate the target object with illuminating light; and a light detection unit configured to detect reflection light of the target object illuminated with the illuminating light, wherein the illumination unit comprises a numerical aperture adjustment device which has a first optical member having a first numerical aperture that is replaceable with a second optical member having a second numerical aperture different from the first numerical aperture so as to reduce a diffraction phenomenon caused by the illuminating light.

16 Claims, 7 Drawing Sheets

(52) U.S. Cl.
CPC .............. *G01N 2201/025* (2013.01); *G01N 2201/0633* (2013.01); *G01N 2201/0636* (2013.01); *G01N 2201/0638* (2013.01); *G01N 2201/0668* (2013.01)

(58) Field of Classification Search
CPC ... G01N 2201/0633; G01N 2201/0636; G01N 2201/0638; G01N 2201/0668
See application file for complete search history.

(56) References Cited

U.S. PATENT DOCUMENTS

| | | |
|---|---|---|
| 2021/0082725 A1 | 3/2021 | Jung et al. |
| 2021/0131961 A1* | 5/2021 | Ohno .................. G01N 21/474 |

FOREIGN PATENT DOCUMENTS

| | | |
|---|---|---|
| KR | 10-2020-0108068 A | 9/2020 |
| KR | 10-2021-0011278 A | 2/2021 |
| KR | 10-2021-0032663 A | 3/2021 |
| KR | 10-2021-0034746 A | 3/2021 |
| KR | 10-2021-0100403 A | 8/2021 |
| KR | 10-2022-0041388 A | 4/2022 |

* cited by examiner

INSPECTION APPARATUS AND INSPECTION METHOD

CROSS-REFERENCE TO RELATED APPLICATION(S)

This application claims the benefit under 35 USC § 119(a) of Korean Patent Application No. 10-2022-0082856, filed on Jul. 6, 2022, in the Korean Intellectual Property Office, the entire disclosure of which is incorporated herein by reference for all purposes.

BACKGROUND

1. Field

The present invention relates to an inspection device and an inspection method, and more particularly, to an inspection apparatus and an inspection method which selectively adjust a numerical aperture of illuminating light in the form of collimated light when inspecting a target object, such as a wafer or the like, using a spectrum, thereby preventing a diffraction phenomenon caused by the illuminating light.

2. Description of Related Art

In general, semiconductor devices may be formed on a silicon wafer used as a semiconductor substrate by repeatedly performing a series of manufacturing processes. For example, a deposition process for forming a thin layer on a substrate, a photolithography process for forming a photoresist pattern on the thin layer, an etching process for patterning the thin layer using the photoresist pattern to form an electrical circuit pattern on the substrate, etc., may be performed.

In this case, after the thin layer or the pattern is formed on the substrate, the thin layer or the pattern may be inspected. For example, an inspection apparatus for performing an inspection process may include a camera unit configured to detect defects or foreign substances on a thin layer formed on a substrate and a light detection unit configured to provide oblique illuminating light onto the substrate and obtain spectral data by detecting light reflected from the substrate. In particular, the inspection apparatus may include a vertical illumination unit configured to provide illuminating light to the substrate in a vertical direction and an oblique illumination unit configured to provide oblique illuminating light onto the semiconductor substrate at a predetermined inclination angle.

SUMMARY

However, the existing illumination units configured to provide illuminating light convert illuminating light emitted from a light source in the form of radiation into collimated light, and a numerical aperture (NA) of the collimated light is generally determined fixedly and used.

Therefore, as the chip size of a wafer becomes smaller or the pattern is reduced in size or becomes more complex, the collimated light whose numerical aperture is already fixedly determined may be significantly diffracted at an unspecified angle, resulting in a great reduction of a resolution of an image or a resolution of a device.

The present invention is devised to solve various problems including the aforementioned problems. An object of the present invention is to provide an inspection apparatus and an inspection method which may prevent a diffraction phenomenon caused by illuminating light by automatically or manually adjusting a numerical aperture of collimated light with a lens turret, increase a resolution of an image, and improve a resolution of a device. However, the object is merely illustrative, and the scope of the present invention is not limited thereto.

In one general aspect, an inspection apparatus may include: a camera unit disposed above a target object; an illumination unit configured to illuminate the target object with illuminating light; and a light detection unit configured to detect reflection light of the target object illuminated with the illuminating light, wherein the illumination unit may include a numerical aperture adjustment device which has a first optical member having a first numerical aperture that is replaceable with a second optical member having a second numerical aperture different from the first numerical aperture so as to reduce a diffraction phenomenon caused by the illuminating light.

In addition, according to the present invention, the numerical aperture adjustment device may include a lens turret rotatably installed and having the first optical member and the second optical member disposed such that the first optical member may be positioned in an optical path of the illuminating light when the lens turret is rotated at a first angle and the second optical member may be positioned at the optical path of the illuminating light when the lens turret is rotated at a second angle, the first optical member may be a through-hole portion having no change in numerical aperture, and the second optical member may be a plurality of focus lenses of different numerical apertures.

In addition, according to the present invention, the numerical aperture adjustment device may further include a turret motor configured to angularly rotate the lens turret at the first angle or the second angle.

In addition, according to the present invention, the numerical aperture adjustment device may further include a controller configured to apply an angular rotation control signal to the turret motor according to any one or any one combination of at least an operator's command input signal, process recipe information, and a diffraction determination signal of a diffraction determination device configured to determine a diffraction phenomenon in image information detected by the camera unit or the light detection unit.

In addition, according to the present invention, the camera unit may be disposed in a vertical direction of the target object, and the illumination unit may include: a vertical illumination unit configured to illuminate the target object with vertical light in a coaxial direction of an optical axis of the camera unit; and an oblique illumination unit configured to illuminate the target object with oblique light.

In addition, according to the present invention, the numerical aperture adjustment device may include: a first numerical aperture adjustment device installed on the vertical illumination unit; and a second numerical aperture adjustment device installed on the oblique illumination unit.

In addition, according to the present invention, the vertical illumination unit may include: a first light source configured to generate the vertical light; a first collimator lens configured to convert the vertical light into collimated light by providing linearity to the vertical light; a first numerical aperture adjustment device configured to adjust a numerical aperture of the vertical light; a first polarizing device configured to polarize the vertical light; and a first reflection mirror configured to reflect the vertical light so as to be coaxial with an optical axis of the camera unit.

In addition, according to the present invention, the oblique illumination unit may include: a second light source configured to generate the oblique light; a second collimator lens configured to converting the oblique light into collimated light by providing linearity to the oblique light; a second numerical aperture adjustment device configured to adjust a numerical aperture of the oblique light; a second polarizing device configured to polarize the oblique light; and a second reflection mirror configured to reflect the oblique light toward the target object.

In addition, according to the present invention, the camera unit may include: a camera disposed in a vertical direction of the target object; a vertical lens unit disposed on an optical path of the camera; an objective lens unit disposed on the optical path of the camera; a third polarizing device installed between the vertical lens unit and the objective lens unit; and a half mirror installed between the vertical lens unit and the objective lens unit and configured to reflect part of the vertical light of the vertical illumination unit, guide the same to the target object through the objective lens unit, and transmit part of the reflection light reflected from the target object toward the camera.

In addition, according to the present invention, the inspection apparatus may further include an oblique light guide unit configured to guide reflection light of the target object illuminated with the oblique light to the light detection unit.

Further, according to the present invention, the oblique light guide unit may include: a first guide mirror configured to reflect the reflection light caused by the oblique light; a fourth polarizing device configured to polarize the reflected reflection light; an oblique lens unit configured to reverse the polarized reflection light and guide the same; and a second guide mirror configured to reflect the reflection light and guide the same to the light detection unit.

In another general aspect, an inspection method may include: (a) illuminating a target object with illuminating light; (b) photographing the target object with a camera unit; and (c) detecting reflection light of the target object illuminated with the illuminating light with a light detection unit, wherein in operation (a), a first optical member having a first numerical aperture may be replaced with a second optical member having a second numerical aperture different from the first numerical aperture so as to reduce a diffraction phenomenon caused by the illuminating light.

In addition, according to the present invention, in operation (a), when a rotatably installed lens turret is rotated at a first angle, the first optical member may be positioned on an optical path of the illuminating light and when the lens turret is rotated at a second angle, the second optical member may be positioned on the optical path of the illuminating light.

In addition, according to the present invention, in operation (a), an angular rotation control signal may be applied to a turret motor, which angularly rotates the lens turret at the first angle or the second angle, according to any one or any one combination of at least an operator's command input signal, process recipe information, and a diffraction determination signal of a diffraction determination device configured to determine a diffraction phenomenon in image information detected by the light detection unit.

In addition, according to the present invention, operation (a) may include: (a-1) illuminating the target object with vertical light in a coaxial direction of an optical axis of the camera unit; and (a-2) illuminating the target object with oblique light.

Moreover, according to the present invention, in operation (a-1), the vertical light may be generated by a first light source, the vertical light may be provided with linearity and converted into collimated light by a first collimator lens, a numerical aperture of the vertical light may be adjusted using a first numerical aperture adjustment device, the vertical light may be polarized, and the vertical light may be reflected by a first reflection mirror so as to be coaxial with the optical axis of the camera unit.

In addition, according to the present invention, in operation (a-2), the oblique light may be generated by a second light source, the oblique light may be provided with linearity and converted into collimated light by a second collimator lens, a numerical aperture of the oblique light may be adjusted using a second numerical aperture adjustment device, the oblique light may be polarized by a second polarizing device, and the oblique light may be reflected by the first reflection mirror toward the target object.

In addition, according to the present invention, in operation (b), part of the reflection light reflected from the target object may be transmitted in a direction of the camera using a half mirror, the reflection light may be polarized by a third polarizing device, and the reflection light may be captured with a camera through an objective lens unit and a vertical lens unit.

Further, according to the present invention, the inspection method may further include: after the step (b), (d) guiding reflection light of the target object illuminated with the oblique light to the light detection unit, wherein in operation (d), the oblique light may be reflected by a first guide mirror, the reflected oblique light may be polarized, the polarized oblique light may be reversed and guided, and the oblique light may be reflected and guided to the light detection unit.

In still another general aspect, an inspection apparatus may include: a camera unit disposed above a target object; an illumination unit configured to illuminate the target object with illuminating light; and a light detection unit configured to detect reflection light of the target object illuminated with the illuminating light, wherein the illumination unit may include a numerical aperture adjustment device which has a first optical member having a first numerical aperture that is replaceable with a second optical member having a second numerical aperture different from the first numerical aperture so as to reduce a diffraction phenomenon caused by the illuminating light, the numerical aperture adjustment device may include a lens turret rotatably installed and having the first optical member and the second optical member disposed such that the first optical member may be positioned in an optical path of the illuminating light when the lens turret is rotated at a first angle and the second optical member may be positioned at the optical path of the illuminating light when the lens turret is rotated at a second angle; a turret motor configured to angularly rotate the lens turret at the first angle or the second angle; and a controller configured to apply an angular rotation control signal to the turret motor according to any one or any one combination of at least an operator's command input signal, process recipe information, and a diffraction determination signal of a diffraction determination device configured to determine a diffraction phenomenon in image information detected by the camera unit or the light detection unit, the camera unit may be disposed in a vertical direction of the target object, the illumination unit may include: a vertical illumination unit configured to illuminate the target object with vertical light in a coaxial direction of an optical axis of the camera unit; and an oblique illumination unit configured to illuminate the target object with oblique light, the vertical illumination unit may include: a first light source configured to generate the vertical light; a first collimator lens configured to convert the vertical light into collimated light by providing linearity to the vertical light; a first numerical aperture adjustment device configured to adjust a numerical aperture of the vertical light; a first polarizing device configured to polarize the vertical light; and a first reflection mirror configured to reflect the vertical light so as to be coaxial with an optical axis of the camera unit, and the oblique illumination unit may include: a second light source configured to generate the oblique light; a second collimator lens configured to converting the oblique light into collimated light by providing linearity to the oblique light; a second numerical aperture adjustment device configured to adjust a numerical aperture of the oblique light; a second polarizing device configured to polarize the oblique light; and a second reflection mirror configured to reflect the oblique light toward the target object.

Other features and aspects will be apparent from the following detailed description, the drawings, and the claims.

Figure 1:
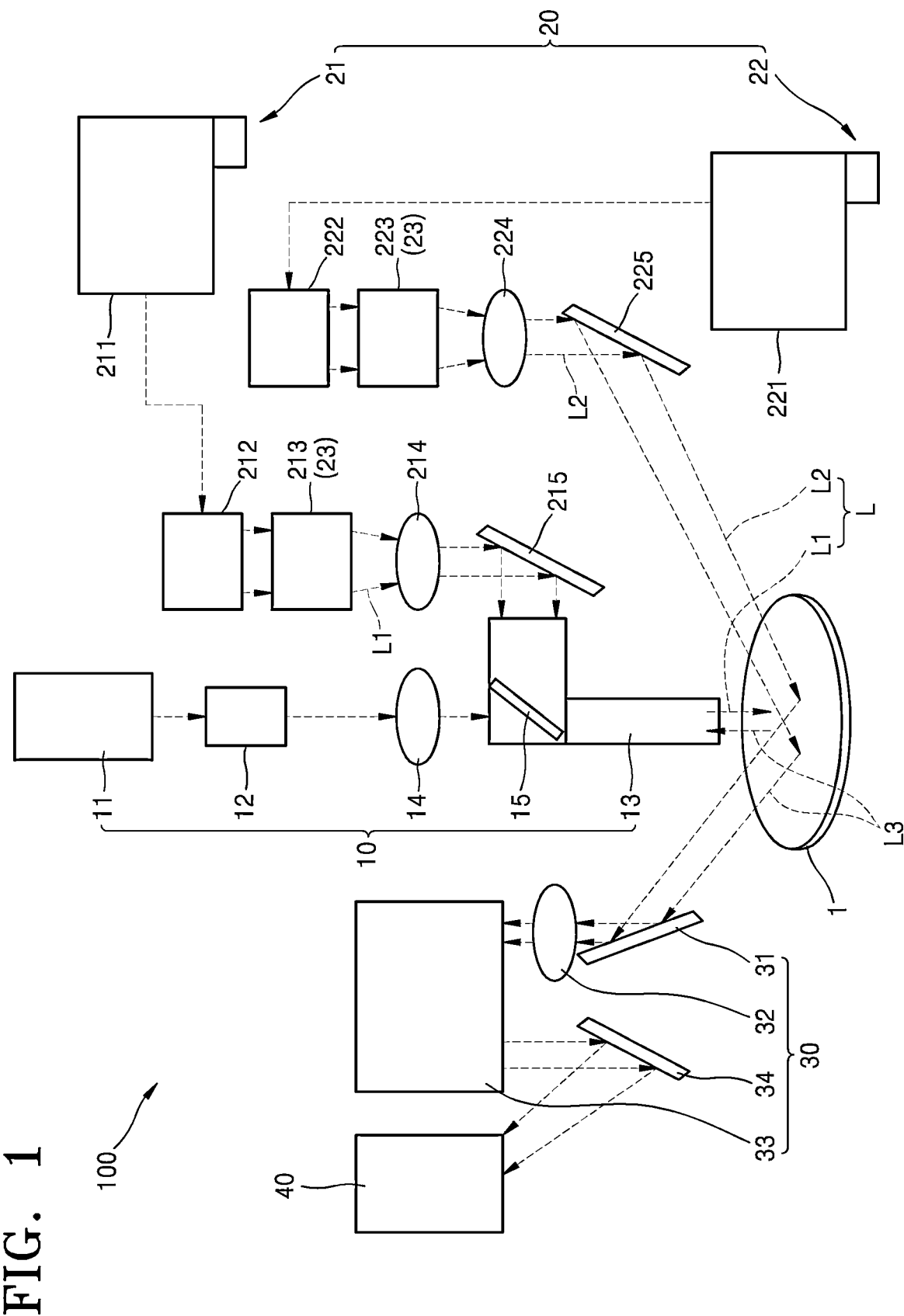
FIG. 1 is a conceptual diagram illustrating the concept of an inspection apparatus according to some embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, various preferred embodiments of the present invention will be described in detail with reference to the accompanying drawings.

The embodiments of the present invention are provided for more fully describing the present invention to those skilled in the art, and the embodiments below may be modified in various forms, and the scope of the present invention is not limited to the embodiments below. Rather, these embodiments are provided such that this disclosure will be thorough and complete and will fully convey the spirit of the present invention to those skilled in the art. Also, thickness or sizes of layers in the drawings are exaggerated for convenience of explanation and clarity.

The terminology used herein is for the purpose of describing particular embodiments only and is not intended to be limiting of exemplary embodiments. As used herein, the singular forms "a," "an," and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

Hereinafter, the embodiments of the present invention are described in detail with reference to the accompanying drawings. In the drawings, the illustrated shapes may be modified according to, for example, manufacturing technology and/or tolerance. Thus, the embodiment of the present invention may not be construed to be limited to a particular shape of a part described in the present specification and may include a change in the shape generated during manufacturing, for example.

Figure 2:
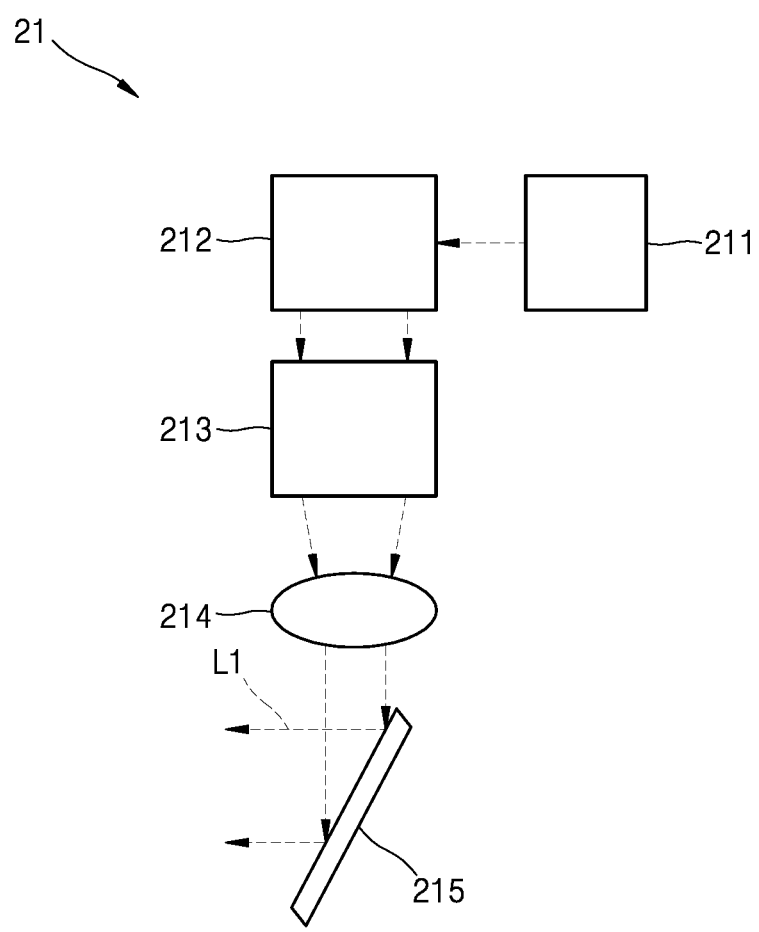
FIG. 2 is a conceptual diagram illustrating a vertical illumination unit of the inspection apparatus of FIG. 1.
Figure 3:
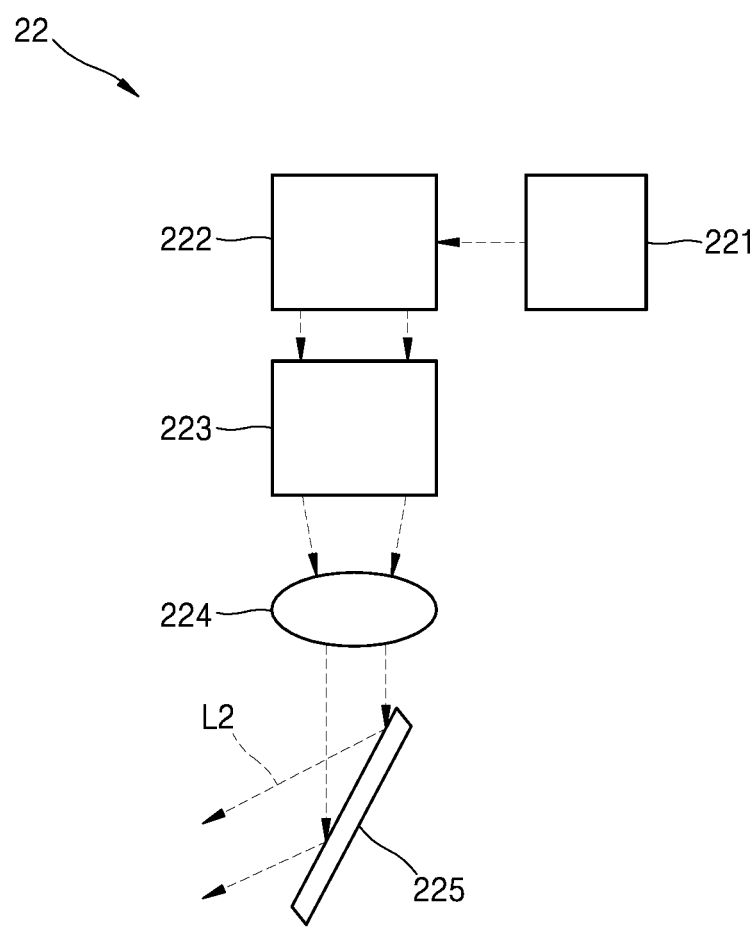
FIG. 3 is a conceptual diagram illustrating an oblique illumination unit of the inspection apparatus of FIG. 1.

FIG. 1 is a conceptual diagram illustrating the concept of an inspection apparatus 100 according to some embodiments of the present invention, FIG. 2 is a conceptual diagram illustrating a vertical illumination unit 21 of the inspection apparatus 100 of FIG. 1, and FIG. 3 is a conceptual diagram illustrating an oblique illumination unit 22 of the inspection apparatus 100 of FIG. 1.

First, as shown in FIGS. 1 to 3, the inspection apparatus 100 according to some embodiments of the present invention, which is an inspection apparatus for performing an inspection on a thin layer or a pattern formed on a substrate such as a wafer in a manufacturing process of a semiconductor device or a display device, may largely include a camera unit 10, an illumination unit 20, an oblique light guide unit 30, and a light detection unit 40.

For example, as shown in FIG. 1, the camera unit 10 may be disposed above a target object 1 and may be disposed generally vertically above the target object 1 such as a wafer, a substrate, or the like. However, the camera unit 10 is not necessarily limited only to the drawings, and may be located at various positions for photographing the object 1.

Here, the target object 1 is also not necessarily limited to the wafer, and any types of target objects whose surface condition is to be checked using a spectral image may be applicable.

More specifically, for example, as shown in FIG. 1, the camera unit 10 may include a camera 11 disposed in a vertical direction of the target object 1, a vertical lens unit 12 disposed on an optical path of the camera 11, an objective lens unit 13 disposed on the optical path of the camera 11, a third polarizing device 14 installed between the vertical lens unit 12 and the objective lens unit 13, and a half mirror 15 installed between the vertical lens unit 12 and the objective lens unit 13 and configured to reflect part of the vertical light L1 of the vertical illumination unit 21, guide the same to the target object 1 through the objective lens unit 13, and transmit part of reflection light L3 reflected from the target object 1 toward the camera 11.

Here, the vertical lens unit 12 may include a telecentric lens, and the objective lens unit 13 may include a high magnification lens with a high magnifying power to enlarge an inspection area.

Therefore, with such a camera unit 10, part of the vertical light L1 of the vertical illumination unit 21 may be reflected in the vertical direction and guided to the target object 1 through the objective lens unit 13 and part of the reflection light L3 reflected from the target object 1 may be transmitted toward the camera 11, so that the camera 11 may detect a defect and a foreign substance of the target object 1 through the vertical lens unit 12.

In addition, for example, as shown in FIG. 1, the illumination unit 20 may be a device for illuminating the target object 1 with illuminating light L, and may include, for example, the vertical illumination unit 21 having a vertical optical system for illuminating the target object 1 with vertical light L1 in a coaxial direction of an optical axis of the camera unit 10 and the oblique illumination unit 22 having an oblique optical system for illuminating the target object 1 with oblique light L2.

More specifically, for example, as shown in FIGS. 1 and 2, the vertical illumination unit 21 may include a first light source 211 configured to generate the vertical light L1, a first collimator lens 212 configured to convert the vertical light L1 into collimated light by providing linearity to the vertical light L1, a first numerical aperture adjustment device 213 configured to adjust a numerical aperture of the vertical light L1, a first polarizing device 214 configured to polarize the vertical light L1, and a first reflection mirror 215 configured to reflect the vertical light L1 so as to be coaxial with the optical axis of the camera unit 10.

Therefore, as shown in FIGS. 1 and 2, the vertical illumination unit 21 may convert the vertical light L1 generated by the first light source 211 into collimated light by providing linearity to the vertical light L1, polarize the vertical light L1 by adjusting the numerical aperture of the vertical light L1 to prevent diffraction, and then reflect the polarized vertical light L1 to be coaxial with the optical axis of the camera unit 10, thereby providing vertical illumination.

In addition, for example, as shown in FIGS. 1 and 2, the oblique illumination unit 22 may include a second light source 221 configured to generate oblique light L2, a second collimator lens 222 configured to converting the oblique light L2 into collimated light by providing linearity to the oblique light L2, a second numerical aperture adjustment device 223 configured to adjust a numerical aperture of the oblique light L2, a second polarizing device 224 configured to polarize the oblique light L2, and a second reflection mirror 225 configured to reflect the oblique light L2 toward the target object 1.

Here, for example, the oblique light L2 may be irradiated to the target object 1 at an incident angle of 65 degrees, that is, the oblique illumination unit 22 may be disposed on one side of the target object 1 so that the optical axis has an inclination angle of 25 degrees.

Therefore, as shown in FIGS. 1 and 2, the oblique illumination unit 22 may convert the oblique light L2 generated by the second light source 221 into collimated light by providing linearity to the oblique light L2, polarize the oblique light L2 by adjusting the numerical aperture of the oblique light L2 to prevent diffraction, and then reflect the polarized oblique light L2 toward the target object 1, thereby providing oblique illumination.

In addition, for example, as shown in FIG. 1, the oblique light guide unit 30 is a device for guiding the reflection light of the target object 1 illuminated with the oblique light L2. More specifically, for example, the oblique light guide unit 30 may include a first guide mirror 31 configured to reflect the reflection light L3 caused by the oblique light L2, a fourth polarizing device 32 configured to polarize the reflected reflection light L3, an oblique lens unit 33 configured to reverse the polarized reflection light L3 and guide the same, and a second guide mirror 34 configured to reflect the reflection light L3 and guide the same to the light detection unit 40.

Thus, the oblique light guide unit 30 may reflect the reflection light L3 caused by the oblique light L2, and guide the reflected reflection light L3 to the light detection unit 40 by polarizing and reversing the reflected reflection light L3.

Also, for example, as shown in FIG. 1, the light detection unit 40 may be a device configured to detect the reflection light L3 of the target object 1 illuminated with the illuminating light L. Accordingly, a spectral image may be checked using the light detection unit 40.

More specifically, for example, the light detection unit 40 may include a spectrometer for acquiring spectral data for a thin layer or a pattern.

Figure 4:
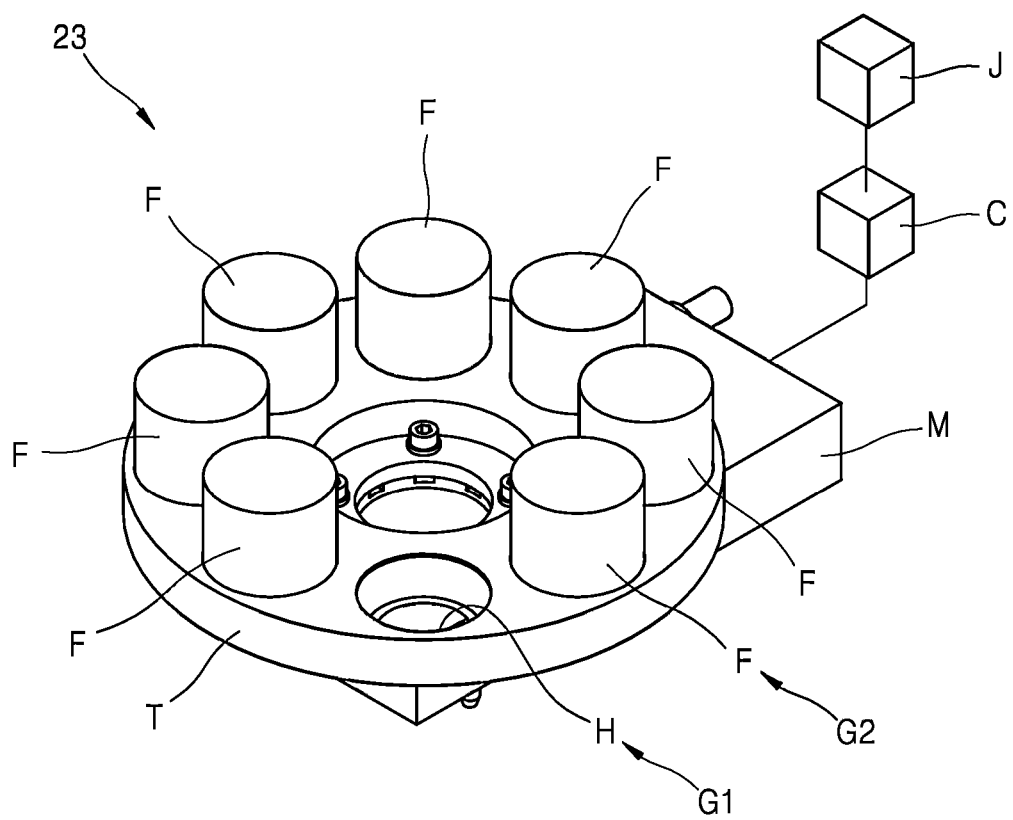
FIG. 4 is a perspective view showing a numerical aperture adjustment device of the inspection apparatus of FIG. 1.
Figure 5:
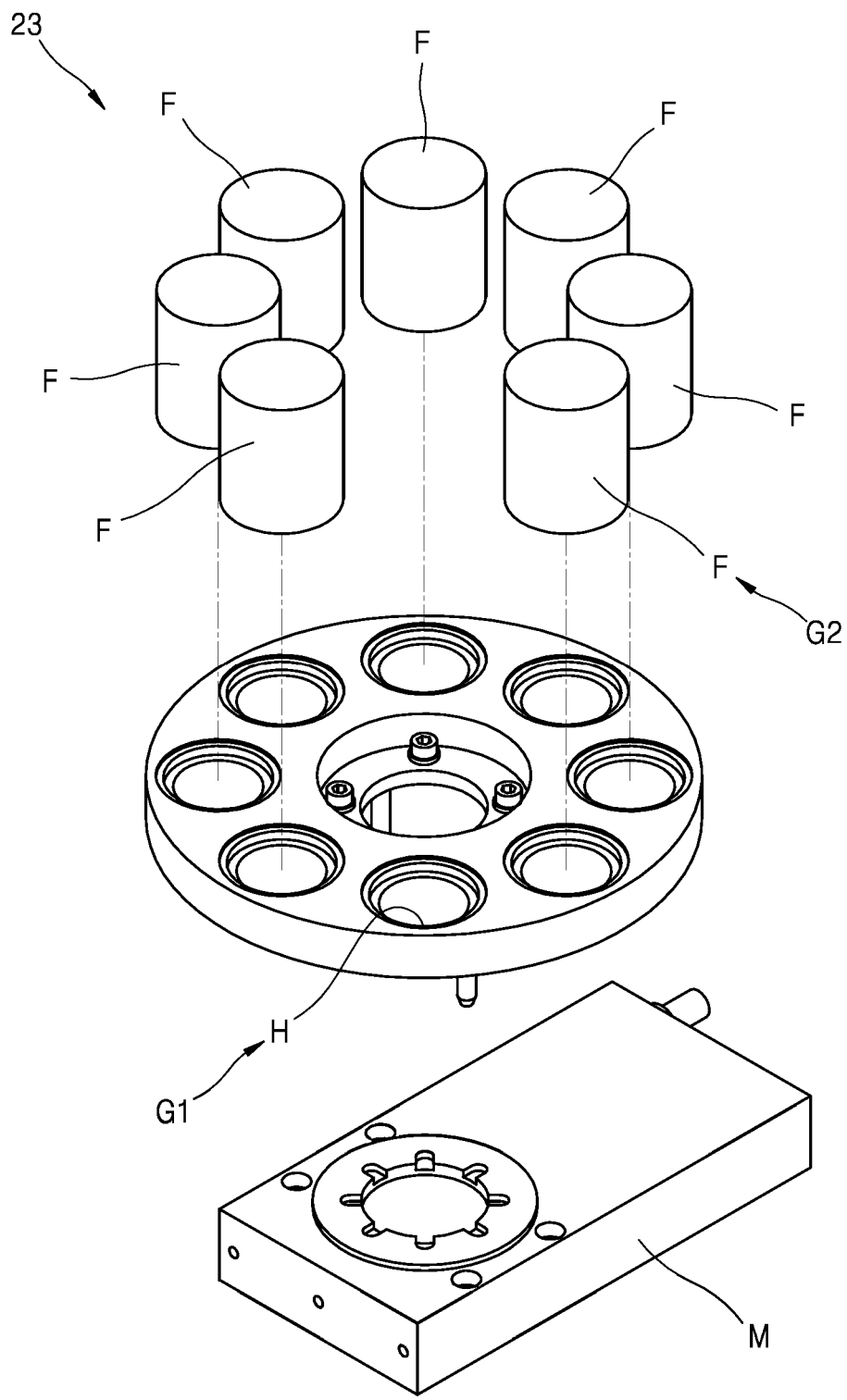
FIG. 5 is an exploded perspective view showing a numerical aperture adjustment device of the inspection apparatus of FIG. 4.

FIG. 4 is a perspective view showing a numerical aperture adjustment device 23 of the inspection apparatus 100 of FIG. 1, and FIG. 5 is an exploded perspective view showing the numerical aperture adjustment device 23 of the inspection apparatus 100 of FIG. 4.

As shown in FIGS. 4 and 5, for example, the illumination unit 20 may include the numerical aperture adjustment device 23 which has a first optical member G1 having a first numerical aperture that is replaceable with a second optical member G2 having a second numerical aperture different from the first numerical aperture so as to reduce a diffraction phenomenon caused by the illuminating light L. More specifically, for example, the numerical aperture adjustment device 23 may include a lens turret T rotatably installed and having the first optical member G1 and the second optical member G2 disposed such that the first optical member G1 may be positioned in the optical path of the illuminating light L when the lens turret T is rotated at a first angle and the second optical member G2 may be positioned at the optical path of the illuminating light L when the lens turret T is rotated at a second angle, and a turret motor M configured to angularly rotate the lens turret T at the first angle or the second angle. Here, the first optical member G1 may be a through-hole portion H having no change in numerical aperture, and the second optical member G2 may be a plurality of focus lenses of different numerical apertures, i.e. seven focus lenses F.

The focus lenses F may be manufactured to have different numerical apertures by varying focal lengths, lens media, or aperture values.

In addition, as shown in FIG. 4, the numerical aperture adjustment device 23 may further include a controller C configured to apply an angular rotation control signal to the turret motor M according to any one or any one combination of at least an operator's command input signal, process recipe information, and a diffraction determination signal of a diffraction determination device J configured to determine a diffraction phenomenon in image information detected by the camera unit 10 or the light detection unit 40.

Here, the numerical aperture adjustment device 23 may include the first numerical aperture adjustment device 213 installed on the vertical illumination unit 21 shown in FIG. 2 and the second numerical aperture adjustment device 223 installed on the oblique illumination unit 22 shown in FIG. 3.

However, the numerical aperture adjustment device 23 may be installed only on either the vertical illumination unit 21 or the oblique illumination unit 22.

Therefore, when a diffraction phenomenon occurs in an image captured by the camera unit 10 or the light detection unit 40, the controller C of the numerical aperture adjustment device 23 may rotate the turret motor M to a specific angle in response to a command signal input by an operator who detects the diffraction phenomenon, so that any one of the through-hole portion H and the focus lenses F that have a numerical aperture without a diffraction phenomenon may be selected.

In addition, in the case of a specific target object 1, the controller C may automatically rotate the turret motor M at a specific angle by utilizing process recipe information including the type of the target object 1, specification, process, and the like, so that the through-hole portion H and the focus lenses F that have a numerical aperture without a diffraction phenomenon may be selected.

In addition, the control unit C may automatically rotate the turret motor M at a specific angle in response to a diffraction determination signal of the diffraction determination device J configured to determine a diffraction phenomenon in image information detected by the camera unit 10 or the light detection unit 40, so that any one of the through hole portion H and the focus lenses F that have a numerical aperture without a diffraction phenomenon may be selected.

Thus, the numerical aperture of each of the vertical light L1 and the oblique light L2 may be manually or automatically adjusted with the rotating lens turret T, thereby preventing the diffraction phenomenon caused by the illuminating light, increasing the resolution of an image, and improving the resolution of a device, and a range of application may be expanded even to various wafers, various chip sizes, complex patterns, various core differences, etc., so that an optimal image may be constantly obtained.

Figure 6:
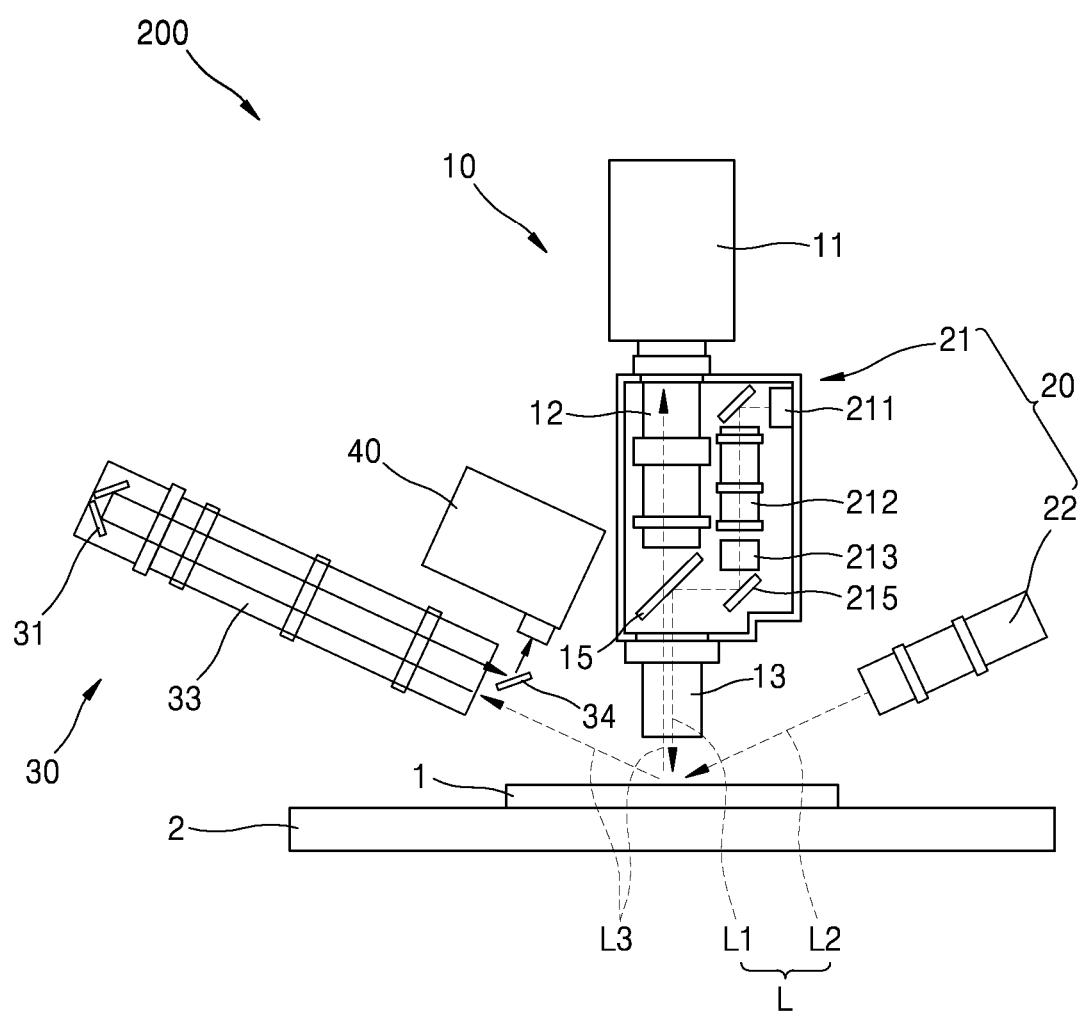
FIG. 6 is a conceptual diagram illustrating the concept of an inspection apparatus according to some other embodiments of the present invention.

FIG. 6 is a conceptual diagram illustrating the concept of an inspection apparatus 200 according to some other embodiments of the present invention.

As shown in FIG. 6, the inspection apparatus 200 according to some other embodiments of the present invention may also include a camera unit 10, an illumination unit 20, an oblique light guide unit 30, and a light detection unit 40, wherein the camera unit 10 may be disposed generally vertically above a target object 1, such as a wafer or a substrate.

Here, the camera unit 10 may include a camera 11 disposed in a vertical direction of the target object 1, a vertical lens unit 12 disposed on an optical path of the camera 11, an objective lens unit 13 disposed on the optical path of the camera 11, and a half mirror 15 installed between the vertical lens unit 12 and the objective lens unit 13 and configured to reflect part of vertical light L1 of the vertical illumination unit 21, guide the same to the target object 1 through the objective lens unit 13, and transmit part of reflection light L3 reflected from the target object 1 toward the camera 11. In addition, the camera unit 10 may have various types of optical systems disposed in various shapes and orders.

Accordingly, by using the camera unit 10, part of the vertical light L1 of the vertical illumination unit 21 may be reflected in a vertical direction and guided to the target object 1 through the objective lens unit 13, and part of the reflection light L3 reflected from the target object 1 may be transmitted toward the camera 11, so that the camera 11 may capture a spectral image through the vertical lens unit 12.

In addition, for example, the illumination unit 20 may be a device for illuminating the target object 1 with illuminating light L, and may include, for example, a vertical illumination unit 21 configured to illuminate the target object 1 with the vertical light L1 in a coaxial direction of an optical axis of the camera unit 10 and an oblique illumination unit 22 configured to illuminate the target object 1 with oblique light L2.

Here, the vertical illumination unit 21 may include a first light source 211 configured to generate the vertical light L1, a first collimator lens 212 configured to convert the vertical light L1 into collimated light by providing linearity to the vertical light L1, a first numerical aperture adjustment device 213 configured to adjust a numerical aperture of the vertical light L1, and a first reflection mirror 215 configured to reflect the vertical light L1 to be coaxial with the optical axis of the camera unit 10.

Therefore, the vertical illumination unit 21 may convert the vertical light L1 generated by the first light source 211 into collimated light by providing linearity to the vertical light L1, polarize the vertical light L1 by adjusting the numerical aperture of the vertical light L1 to prevent diffraction, and then reflect the polarized vertical light L1 to be coaxial with the optical axis of the camera unit 10, thereby providing vertical illumination.

Also, for example, the oblique illumination unit 22 may have the same configuration as the vertical illumination unit 21, or may have a general configuration. In addition, the illumination unit 20 may have various types of optical systems disposed in various shapes and orders.

In addition, for example, the oblique light guide unit 30 is a device for guiding the reflection light of the target object 1 illuminated with the oblique light L2. More specifically, for example, the oblique light guide unit 30 may include a first guide mirror 31 configured to reflect the reflection light L3 caused by the oblique light L2, an oblique lens unit 33 configured to reverse the reflected reflection light L3 and guide the same, and a second guide mirror 34 configured to reflect the reflection light L3 and guide the same to the light detection unit 40. In addition, the oblique light guide unit 30 may also have various types of optical systems disposed in various shapes and orders.

Thus, the oblique light guide unit 30 may reflect the reflection light L3 caused by the oblique light L2, and guide the reflected reflection light L3 to the light detection unit 40 by polarizing and reversing the reflected reflection light L3.

Further, for example, as shown in FIG. 1, the light detection unit 40 may be a device for detecting the reflection light L3 of the target object 1 illuminated with illuminating light L. Accordingly, a spectral image may be checked using the light detection unit 40. In this case, the target object 1 may be a wafer, and the wafer may be seated on a stage 2. In addition, the light detection unit 40 may also have various types of optical systems disposed in various shapes and orders.

Thus, the numerical aperture of each of the vertical light L1 of the illuminating light L may be manually or automatically adjusted with the rotating lens turret T, thereby preventing the diffraction phenomenon caused by the illuminating light, increasing the resolution of the image, and improving the resolution of a device, and a range of application may be expanded even to various wafers, various chip sizes, complex patterns, various core differences, etc., so that an optimal image may be constantly obtained.

Figure 7:
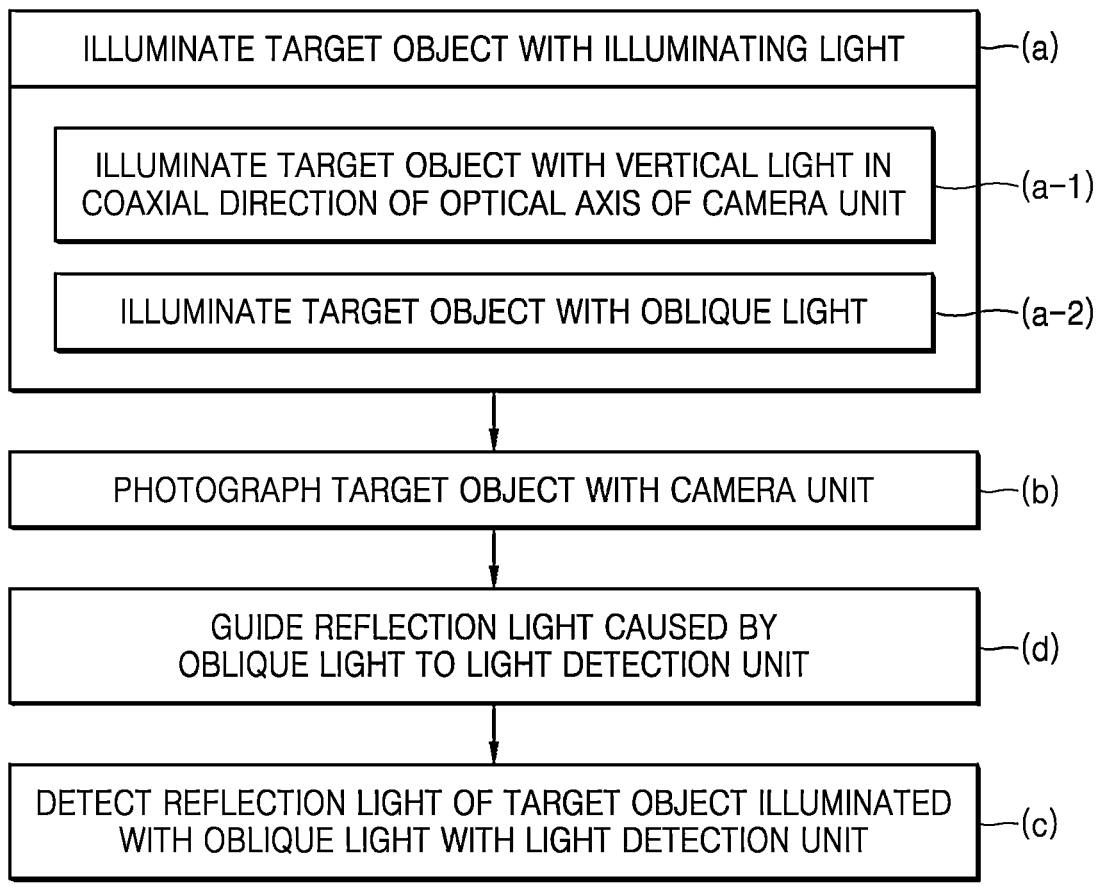
FIG. 7 is a flowchart illustrating an inspection method according to some embodiments of the present invention.

FIG. 7 is a flowchart illustrating an inspection method according to some embodiments of the present invention.

As shown in FIGS. 1 to 7, an inspection method according to some embodiments of the present invention may include: (a) illuminating the target object 1 with illuminating light L; (b) photographing the target object 1 with the camera unit 10; and (c) detecting reflection light L3 of the target object 1 illuminated with the illuminating light L with the light detection unit 40.

Here, in operation (a), the first optical member G1 having a first numerical aperture may be replaced with the second optical member G2 having a second numerical aperture different from the first numerical aperture so as to reduce a diffraction phenomenon caused by the illuminating light L.

In addition, for example, in operation (a), when the rotatably installed lens turret T is rotated at a first angle, the first optical member G1 may be positioned on an optical path of the illuminating light L and when the lens turret T is rotated at a second angle, the second optical member G2 may be positioned on the optical path of the illuminating light L.

In addition, for example, in operation (a), an angular rotation control signal may be applied to the turret motor M, which angularly rotates the lens turret T at the first angle or the second angle, according to any one or any one combination of at least an operator's command input signal, process recipe information, and a diffraction determination signal of a diffraction determination device J configured to determine a diffraction phenomenon in image information detected by the light detection unit 40.

More specifically, for example, operation (a) may include: (a-1) illuminating the target object 1 with vertical light in a coaxial direction of an optical axis of the camera unit 10; and (a-2) illuminating the target object 1 with oblique light L2.

In addition, for example, in operation (a-1), the vertical light L1 may be generated by the first light source 211, the vertical light L1 may be provided with linearity and converted into collimated light by the first collimator lens 212, a numerical aperture of the vertical light L1 may be adjusted using the first numerical aperture adjustment device 213, the vertical light L1 may be polarized by the first polarizing device 214, and the vertical light L1 may be reflected by the first reflection mirror 215 so as to be coaxial with the optical axis of the camera unit 10.

Also, for example, in operation (a-2), the oblique light L2 may be generated by the second light source 221, the oblique light L2 may be provided with linearity and converted into collimated light by the second collimator lens 222, a numerical aperture of the oblique light L2 may be adjusted using the second numerical aperture adjustment device 223, the oblique light L2 may be polarized by the second polarizing device 224, and the oblique light L2 may be reflected by the first reflection mirror 215 toward the target object 1.

Meanwhile, for example, in operation (b), part of the reflection light L3 reflected from the target object 1 may be transmitted in a direction of the camera 11 using the half mirror 15, the reflection light L3 may be polarized by the third polarizing device 14, and the reflection light L3 may be captured with the camera 11 through the objective lens unit 13 and the vertical lens unit 12.

Further, for example, the inspection method may further include (d) guiding the oblique light L2 of the oblique illumination unit 22 to the light detection unit 40 after operation (b), wherein in operation (d), the oblique light L2 may be reflected by the first guide mirror 31, the reflected oblique light L2 may be polarized, the polarized oblique light L2 may be reversed and guided, and the oblique light L2 may be reflected and guided to the light detection unit 40.

According to various embodiments of the present invention as described above, a numerical aperture of collimated light may be manually or automatically adjusted using a rotating lens turret, thereby preventing a diffraction phenomenon caused by illuminating light, increasing a resolution of an image, and improving a resolution of a device, and a range of application may be expanded even to various wafers, various chip sizes, complex patterns, various core differences, etc., so that an optimal image may be constantly obtained. However, the scope of the present disclosure is not limited by the above effects.

While the present invention has been particularly shown and described with reference to embodiments thereof, it will be understood by those of ordinary skill in the art that various changes in form and details may be made therein without departing from the spirit and scope of the present invention as defined by the following claims.

REFERENCE NUMERALS

1: TARGET OBJECT
2: STAGE
L: ILLUMINATING LIGHT
L1: VERTICAL LIGHT
L2: OBLIQUE LIGHT
L3: REFLECTION LIGHT
10: CAMERA UNIT
11: CAMERA
12: VERTICAL LENS UNIT
13: OBJECTIVE LENS UNIT
14: THIRD POLARIZING DEVICE
15: HALF MIRROR
20: ILLUMINATION UNIT
21: VERTICAL ILLUMINATION UNIT
211: FIRST LIGHT SOURCE
212: FIRST COLLIMATOR LENS
213: FIRST NUMERICAL APERTURE ADJUSTMENT DEVICE
214: FIRST POLARIZING DEVICE
215: FIRST REFLECTION MIRROR
22: OBLIQUE ILLUMINATION UNIT
221: SECOND LIGHT SOURCE
222: SECOND COLLIMATOR LENS
223: SECOND NUMERICAL APERTURE ADJUSTMENT DEVICE
224: SECOND POLARIZING DEVICE
225: SECOND REFLECTION MIRROR
23: NUMERICAL APERTURE ADJUSTMENT DEVICE
G1: FIRST OPTICAL MEMBER
G2: SECOND OPTICAL MEMBER
T: LENS TURRET
H: THROUGH-HOLE PORTION
F: FOCUS LENS
M: TURRET MOTOR
J: DIFFRACTION DETERMINATION DEVICE
C: CONTROLLER
30: OBLIQUE LIGHT GUIDE UNIT
31: FIRST GUIDE MIRROR
32: FOURTH POLARIZING DEVICE
33: OBLIQUE LENS UNIT
34: SECOND GUIDE MIRROR
40: LIGHT DETECTION UNIT
100, 200: INSPECTION APPARATUS

What is claimed is:

1. An inspection apparatus comprising:
a camera unit above a target object;
an illumination unit configured to illuminate the target object with illuminating light; and
a light detection unit configured to detect reflection light of the target object illuminated with the illuminating light,
wherein the illumination unit comprises
a numerical aperture adjustment device including a first optical member having a first numerical aperture and is configured to be replaceable with a second optical member having a second numerical aperture different from the first numerical aperture so as to reduce a diffraction phenomenon caused by the illuminating light, and
a first polarizing device configured to polarize the illuminating light,
wherein:
the camera unit is in a vertical direction of the target object, and the illumination unit may include
a vertical illumination unit configured to illuminate the target object with vertical light in a coaxial direction of an optical axis of the camera unit, and
an oblique illumination unit configured to illuminate the target object with oblique light,
wherein the vertical illumination unit comprises:
a first light source configured to generate the vertical light;
a first collimator lens configured to convert the vertical light into collimated light by providing linearity to the vertical light;
a first numerical aperture adjustment device configured to adjust a numerical aperture of the vertical light;
the first polarizing device is configured to polarize the vertical light; and
a first reflection mirror configured to reflect the vertical light so as to be coaxial with the optical axis of the camera unit.

2. The inspection apparatus of claim 1, wherein:
the numerical aperture adjustment device comprises
a lens turret configured to be rotatable and includes the first optical member and the second optical member such that the first optical member is configured to be positioned in an optical path of the illuminating light when the lens turret is rotated to a first angle and the second optical member is configured to be positioned at the optical path of the illuminating light when the lens turret is rotated to a second angle,
the first optical member is a through-hole portion having no change in numerical aperture, and
the second optical member is a plurality of focus lenses of different numerical apertures.

3. The inspection apparatus of claim 2, wherein the numerical aperture adjustment device further comprises a turret motor configured to angularly rotate the lens turret to the first angle or the second angle.

4. The inspection apparatus of claim 3, wherein the numerical aperture adjustment device further comprises a controller configured to apply an angular rotation control signal to the turret motor according to any one or any one combination of at least an operator's command input signal, process recipe information, and a diffraction determination signal of a diffraction determination device configured to determine the diffraction phenomenon in image information detected by the camera unit or the light detection unit.

5. The inspection apparatus of claim 1, wherein the numerical aperture adjustment device comprises:
the first numerical aperture adjustment device on the vertical illumination unit; and
a second numerical aperture adjustment device on the oblique illumination unit.

6. The inspection apparatus of claim 1, wherein the oblique illumination unit comprises:
a second light source configured to generate the oblique light;
a second collimator lens configured to convert the oblique light into collimated light by providing linearity to the oblique light;
a second numerical aperture adjustment device configured to adjust a numerical aperture of the oblique light;
a second polarizing device configured to polarize the oblique light; and
a second reflection mirror configured to reflect the oblique light toward the target object.

7. The inspection apparatus of claim 1, wherein the camera unit comprises:
a camera facing the target object in the vertical direction;
a vertical lens unit in an optical path of the camera;
an objective lens unit in the optical path of the camera;
a third polarizing device between the vertical lens unit and the objective lens unit; and
a half mirror between the vertical lens unit and the objective lens unit and configured to reflect part of the vertical light of the vertical illumination unit, guide a same to the target object through the objective lens unit, and transmit part of the reflection light reflected from the target object toward the camera.

8. The inspection apparatus of claim 1, further comprising an oblique light guide unit configured to guide the reflection light of the target object illuminated with the oblique light to the light detection unit.

9. The inspection apparatus of claim 8, wherein the oblique light guide unit comprises:
a first guide mirror configured to generate reflected reflection light by reflecting the reflection light caused by the oblique light;
a fourth polarizing device configured to generate polarized reflection light by polarizing the reflected reflection light;
an oblique lens unit configured to reverse the polarized reflection light and guide a same; and
a second guide mirror configured to reflect the reflection light and guide a same to the light detection unit.

10. An inspection method comprising:
(a) illuminating a target object with illuminating light;
(b) photographing the target object with a camera unit; and
(c) detecting reflection light of the target object illuminated with the illuminating light with a light detection unit,
wherein in operation (a), a first optical member having a first numerical aperture is replaced with a second optical member having a second numerical aperture different from the first numerical aperture so as to reduce a diffraction phenomenon caused by the illuminating light,
wherein the illuminating light in operation (a) is polarized,
wherein operation (a) comprises:
(a-1) illuminating the target object with vertical light in a coaxial direction of an optical axis of the camera unit; and
(a-2) illuminating the target object with oblique light, and
wherein, in operation (a-1), the vertical light is generated by a first light source, the vertical light is provided with linearity and converted into collimated light by a first collimator lens, a numerical aperture of the vertical light is adjusted using a first numerical aperture adjustment device, the vertical light is polarized, and the vertical light is reflected by a first reflection mirror so as to be coaxial with the optical axis of the camera unit.

11. The inspection method of claim 10, wherein, in operation (a), when a rotatable lens turret is rotated to a first angle, the first optical member is positioned on an optical path of the illuminating light and when the lens turret is rotated to a second angle, the second optical member is positioned on the optical path of the illuminating light.

12. The inspection method of claim 11, wherein, in operation (a), an angular rotation control signal is applied to a turret motor, the turret motor rotates the lens turret to the first angle or the second angle, according to any one of, or a combination of, an operator's command input signal, process recipe information, and a diffraction determination signal of a diffraction determination device configured to determine the diffraction phenomenon in image information detected by the light detection unit.

13. The inspection method of claim 10, wherein, in operation (a-2), the oblique light is generated by a second light source, the oblique light is provided with linearity and converted into collimated light by a second collimator lens, a numerical aperture of the oblique light is adjusted using a second numerical aperture adjustment device, the oblique light is polarized by a second polarizing device, and the oblique light is reflected by the first reflection mirror toward the target object.

14. The inspection method of claim 10, wherein, in operation (b), part of the reflection light reflected from the target object is transmitted in a direction of the camera unit using a half mirror, the reflection light is polarized by a third polarizing device, and the reflection light is captured with a camera through an objective lens unit and a vertical lens unit.

15. The inspection method of claim 10, further comprising: after the step (b), (d) guiding the reflection light of the target object illuminated with the oblique light to the light detection unit,
wherein in operation (d), the oblique light is reflected by a first guide mirror generating reflected oblique light, the reflected oblique light is polarized generating polarized oblique light, the polarized oblique light is reversed and guided, and the oblique light is reflected and guided to the light detection unit.

16. An inspection apparatus comprising:
a camera unit above a target object;
an illumination unit configured to illuminate the target object with illuminating light; and
a light detection unit configured to detect reflection light of the target object illuminated with the illuminating light,
wherein:
the illumination unit comprises a numerical aperture adjustment device which has a first optical member having a first numerical aperture that is replaceable with a second optical member having a second numerical aperture different from the first numerical aperture so as to reduce a diffraction phenomenon caused by the illuminating light,
the numerical aperture adjustment device comprises:
a lens turret configured to be rotatable and having the first optical member and the second optical member such that the first optical member may be positioned in an optical path of the illuminating light when the lens turret is rotated to a first angle and the second optical member may be positioned in the optical path of the illuminating light when the lens turret is rotated to a second angle;
a turret motor configured to angularly rotate the lens turret to the first angle or the second angle; and
a controller configured to apply an angular rotation control signal to the turret motor according to any one or any one combination of at least an operator's command input signal, process recipe information, and a diffraction determination signal of a diffraction determination device configured to determine the diffraction phenomenon in image information detected by the camera unit or the light detection unit,
the camera unit is in a vertical direction of the target object,
the illumination unit comprises:
a vertical illumination unit configured to illuminate the target object with vertical light in a coaxial direction of an optical axis of the camera unit; and
an oblique illumination unit configured to illuminate the target object with oblique light,
the vertical illumination unit comprises:
a first light source configured to generate the vertical light;
a first collimator lens configured to convert the vertical light into collimated light by providing linearity to the vertical light;
a first numerical aperture adjustment device configured to adjust a numerical aperture of the vertical light;
a first polarizing device configured to polarize the vertical light; and
a first reflection mirror configured to reflect the vertical light so as to be coaxial with the optical axis of the camera unit, and
the oblique illumination unit comprises:
a second light source configured to generate the oblique light;
a second collimator lens configured to convert the oblique light into collimated light by providing linearity to the oblique light;
a second numerical aperture adjustment device configured to adjust a numerical aperture of the oblique light;
a second polarizing device configured to polarize the oblique light; and
a second reflection mirror configured to reflect the oblique light toward the target object.

* * * * *